United States Patent
Uchida et al.

(10) Patent No.: US 8,300,278 B2
(45) Date of Patent: Oct. 30, 2012

(54) ORIGINAL READER, OPTICAL MODULE, AND OPTICAL READING METHOD

(75) Inventors: Toru Uchida, Shizuoka (JP); Kazuya Shouji, Tokyo (JP)

(73) Assignee: NEC Corporation, Tokyo (JP)

( * ) Notice: Subject to any disclaimer, the term of this patent is extended or adjusted under 35 U.S.C. 154(b) by 1168 days.

(21) Appl. No.: 11/093,489

(22) Filed: Mar. 30, 2005

(65) Prior Publication Data
US 2005/0219651 A1 Oct. 6, 2005

(30) Foreign Application Priority Data
Mar. 31, 2004 (JP) ................................ 2004-102996

(51) Int. Cl.
H04N 1/04 (2006.01)
H04N 1/46 (2006.01)
G02B 5/32 (2006.01)
G03H 1/02 (2006.01)

(52) U.S. Cl. ........ 358/474; 358/487; 358/505; 358/509; 359/17; 359/19; 359/27

(58) Field of Classification Search .................. 359/489, 359/209, 210, 211, 212, 196, 197, 198, 200; 399/211; 358/494, 474
See application file for complete search history.

(56) References Cited

U.S. PATENT DOCUMENTS

| | | | |
|---|---|---|---|
| 5,027,424 A * | 6/1991 | Yamazaki et al. | 382/321 |
| 6,830,312 B2 * | 12/2004 | Muramatsu et al. | 347/37 |
| 6,831,759 B1 * | 12/2004 | Witte et al. | 358/474 |
| 2003/0218782 A1 * | 11/2003 | Hooper et al. | 358/474 |
| 2005/0063871 A1 * | 3/2005 | Kubota et al. | 422/82.05 |

FOREIGN PATENT DOCUMENTS

| | | |
|---|---|---|
| JP | 06-301121 | 10/1994 |
| JP | 09-163098 | 6/1997 |
| JP | 2000-050031 | 2/2000 |
| JP | 2000-253209 | 9/2000 |
| JP | 2001-077983 | 3/2001 |
| JP | 2003-029353 | 1/2003 |
| JP | 2003-295342 | 10/2003 |
| JP | 2003-315930 | 11/2003 |

OTHER PUBLICATIONS

Muramatsu et al., Optical Device, Nov. 2003, Machine Translation of Japan, JP2003315930, pp. [0030]-[0032].*
Office Action, Japanese Patent Application No. 2004-102996, dated Dec. 7, 2007 (with English Translation of relevant portions).

* cited by examiner

*Primary Examiner* — Benny Q Tieu
*Assistant Examiner* — Ngon Nguyen
(74) *Attorney, Agent, or Firm* — Michael Best & Friedrich LLP (57) ABSTRACT

A module 1 movable over the original surface 110 of the original reader 100 has a metal sheet frame 4 disposed in the vicinity of its gravitational center and having a substantially channel-like shape. A first and a second optical systems 2 and 3 and a drive source 6 assembled to be integral with a flat part 40 of the metal sheet frame 4. Thus, a reduced-size, improved quality and improved-accuracy original reader to be used for facsimile devices and image scanners is obtained.

6 Claims, 12 Drawing Sheets

ORIGINAL READER, OPTICAL MODULE, AND OPTICAL READING METHOD

This application claims benefit of Japanese Patent Application No. 2004-102996 filed on Mar. 31, 2004, the contents of which are incorporated by the reference.

BACKGROUND OF THE INVENTION

The present invention relates to original readers and an optical reading method and, more particularly, to an original reader and an optical reading method, which are used for facsimile units, digital copiers, scanners, etc., and serves to optically read out letters and/or drawing data from an original with scanning by a module 1, which includes a light source, a contracting optical system and a CCD as integral constituents, and convert the read-out data to electric signal.

With rapid development of communication techniques of facsimile units or the like and data processing techniques mainly concerning personal computers, has made it necessary to read out letters and/or drawing data from an original and transfer the read-out data with the above facsimile unit or input the data to a data processing unit such as a personal computer. The original reader is an input means to this end.

In such original reader, part of letters and/or drawings is optically read out usually by using a sensor including a photosensitive device such as a linear CCD (charge-coupled device) array, and shift of relative positions of the sensor and the original, i.e., scanning, is caused. It is thus usual to read out two-dimensional letters and/or drawing data from an original by conversion to electric signals. As for the relative shift, i.e., scanning, between the sensor and original, in the case of the facsimile unit the original is shifted by a mechanical drive means. In the case of the scanner or the like, the original is held stationary on an original support table while causing the sensor shift.

Prior art of such original readers is disclosed in various literatures. As an example, an image reader is disclosed, which comprises a first carriage having a mirror for receiving light from a scanning surface and a second carriage having two mirrors for receiving light from the first carriage mirror and forming a light path up to a CCD. The image reader further comprises a bearing holder with a bearing secured thereto such as to be in contact with the second carriage being shifted in the scanning direction, a mirror holder, and a reinforcing member for reinforcing the bearing holder and the mirror holder. The image reader thus can quickly read out high quality images free from swaying or deviation (see Literature 1: Japanese Laid-open 2000-253209).

Another image reader is also disclosed, in which a motor, a speed change gear, a synchromesh pulley and a slider are disposed on a scanner holder, and also an image sensor unit is disposed on the holder by means of a spring. In this image reader, the reliability of the scanning of the scanner for reading is held suitably (see Literature 2: Japanese Laid-open 2001-77983). Furthermore, a reflector mounting arrangement for an image reader is disclosed. In this arrangement, a carriage with an optical unit assembled therein has an also assembled reinforcing member, with a reflector tied thereto. Thus, the operability of assembling the reflector and the mounting accuracy are improved (see Literature 3: Japanese Laid-open 2003-295342).

However, the above prior art original readers have problems that the stability, reading accuracy and size and weight reduction are insufficient.

SUMMARY OF THE INVENTION

The present invention was made in view of the above problems in the above prior art, and it has an object of providing an image reader capable of size reduction, speed increase, simplification and image quality improvement at high levels.

According to an aspect of the present invention, there is provided an original reader comprising a module including, as integral constituents, a light source for illuminating an original, a contracting optical system having a lens and a mirror and a line sensor, for reading out original surface data by performing main scanning to linearly scan the original with the line sensor and auxiliary scanning to mechanically scan the module in directions normal to the main scanning directions, wherein: the module has a metal sheet frame extending in the vicinity of its gravitational center and parallel to the auxiliary scanning directions; and the light path of the contracting optical system is reciprocated a plurality of times on the side closer to the original surface on the flat part of the frame in the first optical system constituted by a plurality of mirrors before penetrating an opening in the frame flat part and being led to a second optical system disposed more apart from the original surface of the frame flat part and constituted by a lens, a CCD and a mirror.

The first optical system is positioned and secured to the flat part of the frame. A drive source for driving the module in the auxiliary scanning direction is secured to the flat part of the frame such that a drive gear of the drive source penetrates a notch formed in the frame flat part and the drive gear of the drive source transfers the drive power of the drive source via the shaft of a transfer gear for the transfer, the transfer gear shaft being provided on the frame flat part on the side thereof opposite the drive source.

The flat part of the frame has a slide member corresponding to a rail for guiding the module in the auxiliary scanning directions. The first optical system is constituted by a pair of substantially parallel mirrors with the light path reciprocated therebetween and a single mirror for causing light from the original to be incident on the pair of mirrors, the pair of mirrors are substantially normal to the original surface, the single mirror is located on the side of the pair of mirrors opposite the original surface, the light path led from the original surface to the single mirror crosses the light path of reciprocation between the pair of mirrors, and the pair of mirrors and the single mirror have their ends each positioned by a side member with the edge thereof positioned on the flat part of the frame.

The module has a drum shaft and pulley shafts secured to the same surface of the flat part of the frame, with a wire passed round the drum and pulleys for driving the module. An electrically conductive member is mounted on the end of the frame and electrically grounded via the rails. The slide member also serves as the electrically conductive member. Leaf springs are mounted on the frame and in contact with end parts of the mirrors in the first optical system, the contact parts of the mirrors and the leaf springs being capable of slipping relative to one another to thereby convert vibration energy to heat energy, thus attenuating vibrations of the mirrors.

According to another aspect of the present invention, there is provided an original reader comprising a module including a light source for illuminating an original, a contracting optical system and a line sensor, wherein: the original is optically read out by linear scan with the line sensor while scanning in the perpendicular direction to the liner scan direction with movement of the module.

According to other aspect of the present invention, there is provided an optical reading method of original including step of linear scan with a line sensor including a light source for illuminating an original, a contracting optical system and the line sensor while scanning in the perpendicular direction to the liner scan direction with movement of the module.

Other objects and features will be clarified from the following description with reference to attached drawings.

In the present invention, since the first optical system does not penetrate the metal sheet frame, it is possible to reduce the opening of the metal sheet frame. Thus, it is possible to improve the rigidity of the metal sheet frame, the CCD substrate is made parallel to the flat part of the metal sheet frame, the potential can be readily made stable. Thus, it is possible to alleviate the noise radiation and extremely reduce adverse effects of external noise. Secondly, since both the first and second optical systems can be directly positioned and secured to the flat part of the frame, and the accuracy thus can be improved.

Thirdly, since the drive gear, transfer gear and drive drum are all positioned on the same surface of the same metal sheet frame, it is possible to improve the accuracy and rigidity and ensure stable quality. Fourthly, since the guide for the scanning of the module and the first and second optical systems are all positioned on the same surface of the same part, the accuracy is improved. Fifthly, since the mirror group constituting the first optical system is positioned by a pair of side members, and the first optical system is positioned by using a pair of side members. Thus, the positioning can be made with accuracy right after the press operation, thus improving the accuracy, requiring no adjustment and ensuring stable quality. Sixthly, since the drum and pulleys for driving and guiding a wire are secured to the same part, it is possible to improve the rigidity and ensure stable running. Seventhly, the potential of the metal sheet frame is stabilized, the reliability with respect to noise is further improved.

PREFERRED EMBODIMENTS OF THE INVENTION

Preferred embodiments of the present invention will now be described with reference to the drawings.

Figure 1:
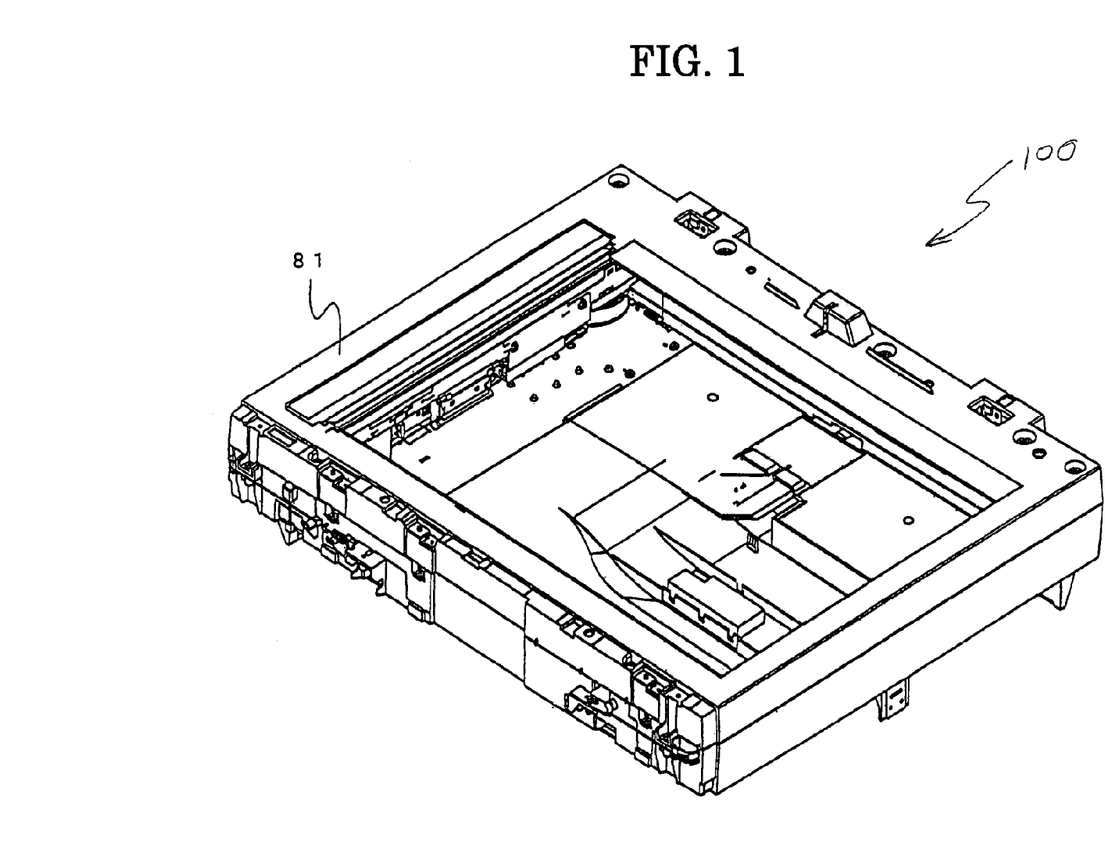
FIG. 1 shows the appearance of the original reader 100 in the perfectly assembled state according to the present invention.
Figure 2:
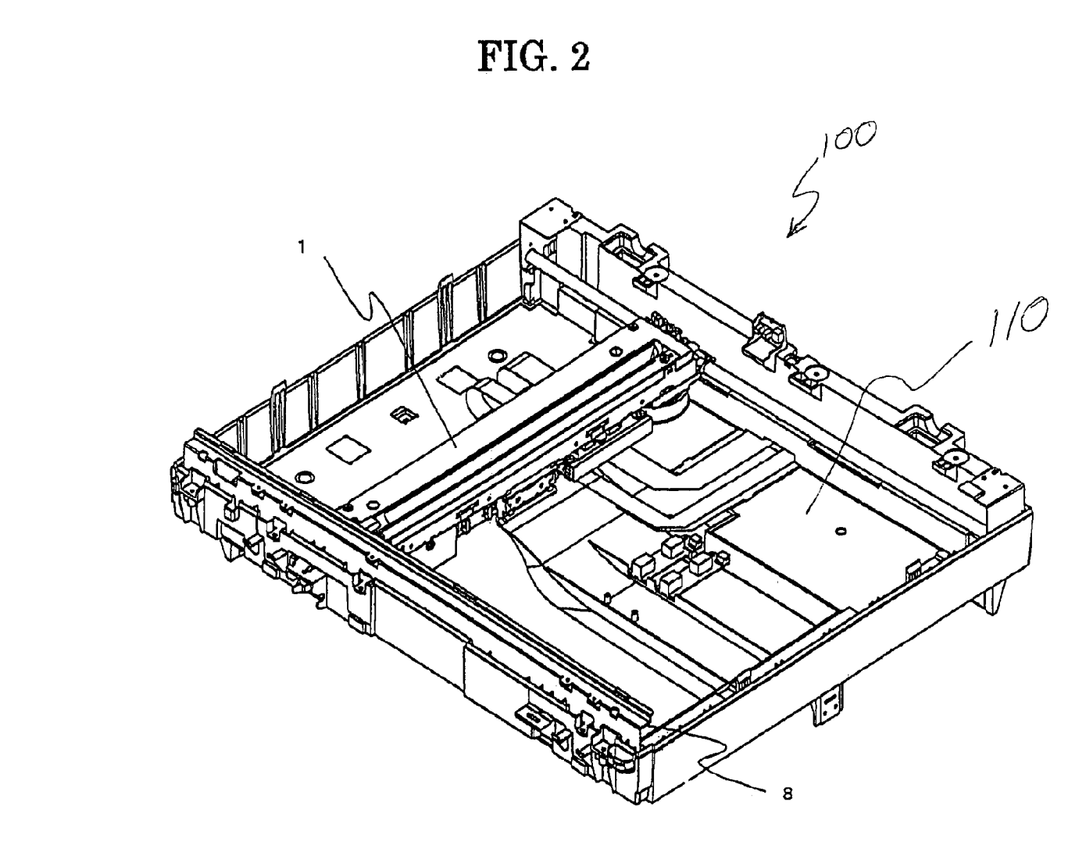
FIG. 2 is a perspective view showing the FIG. 1 original reader 100 with the cover 81 removed according to the present invention.

FIGS. 1 and 2 are perspective views showing the appearance of the entirety of a preferred embodiment of the original reader according to the present invention. FIG. 1 shows the appearance of the original reader 100 in the perfectly assembled state. As shown in FIG. 1, the original reader 100 is relatively flat and substantially rectangular as a whole, with a cover 81 provided at the top. A central part of the cover 81 has an original support surface (or original support part) 110 of a predetermined size, on which an original (not shown) to be read out by the original reader 100 is set.

FIG. 2 is a perspective view showing the FIG. 1 original reader 100 with the cover 81 removed. Inside the original reader 100, a number of constituent parts for executing the original reading operation are disposed. The following description mainly concerns parts directly relevant to the present invention, and the constituent parts not directly relevant to the subject of the present invention or conventional constituent parts well known to the person in the field are not described. The original reader 100 comprises a relatively elongate module 1, which is frictionally movable along opposite side rails over the original support part 110 to the left and right in FIG. 2, and a front rail 8 extending on the front side of the module 1.

Figure 3:
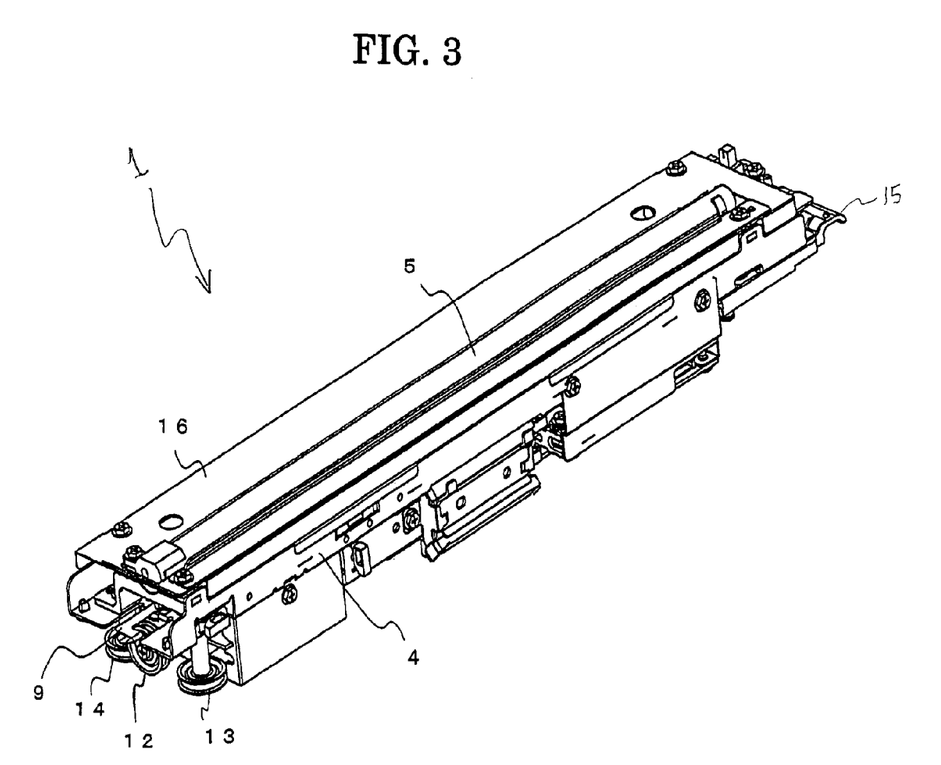
FIG. 3 is a perspective view showing the module 1 viewed downward according to the present invention.
Figure 4:
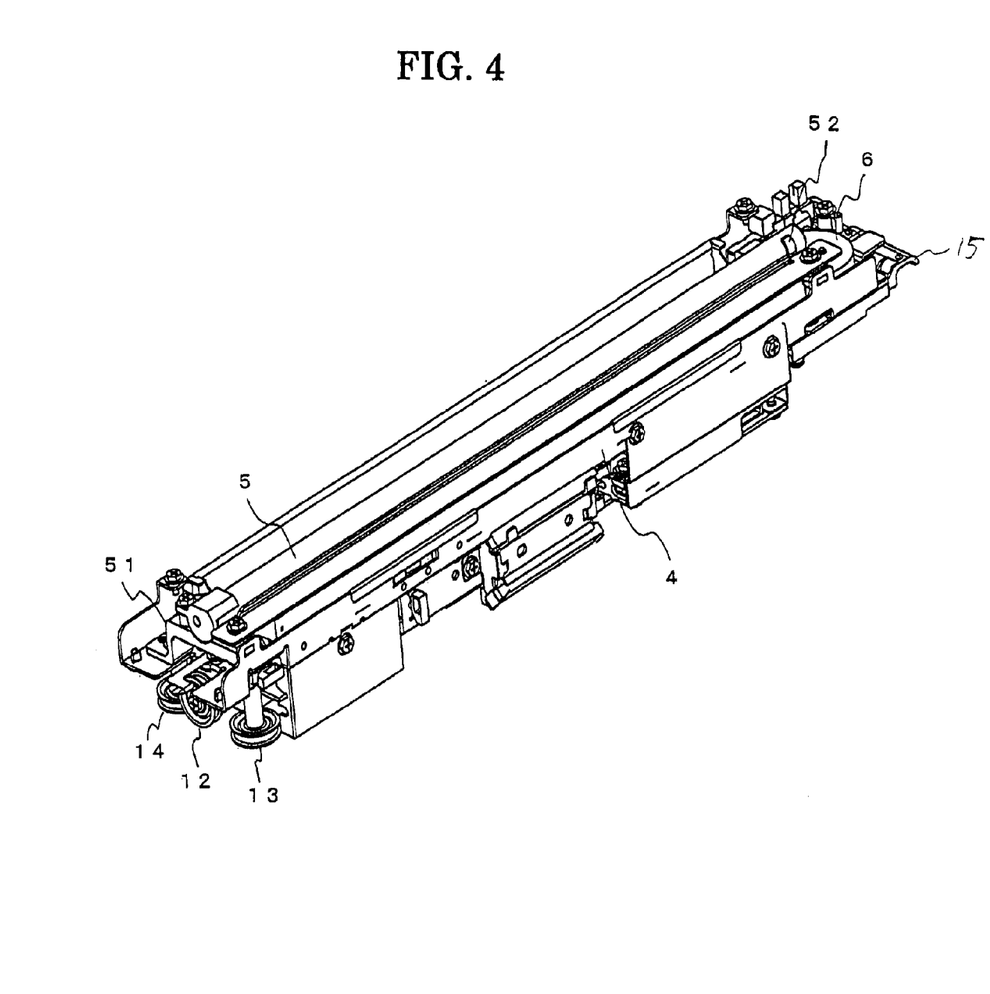
FIG. 4 is a perspective view showing the FIG. 3 module 1 with the top module cover 16 removed according to the present invention.
Figure 5:
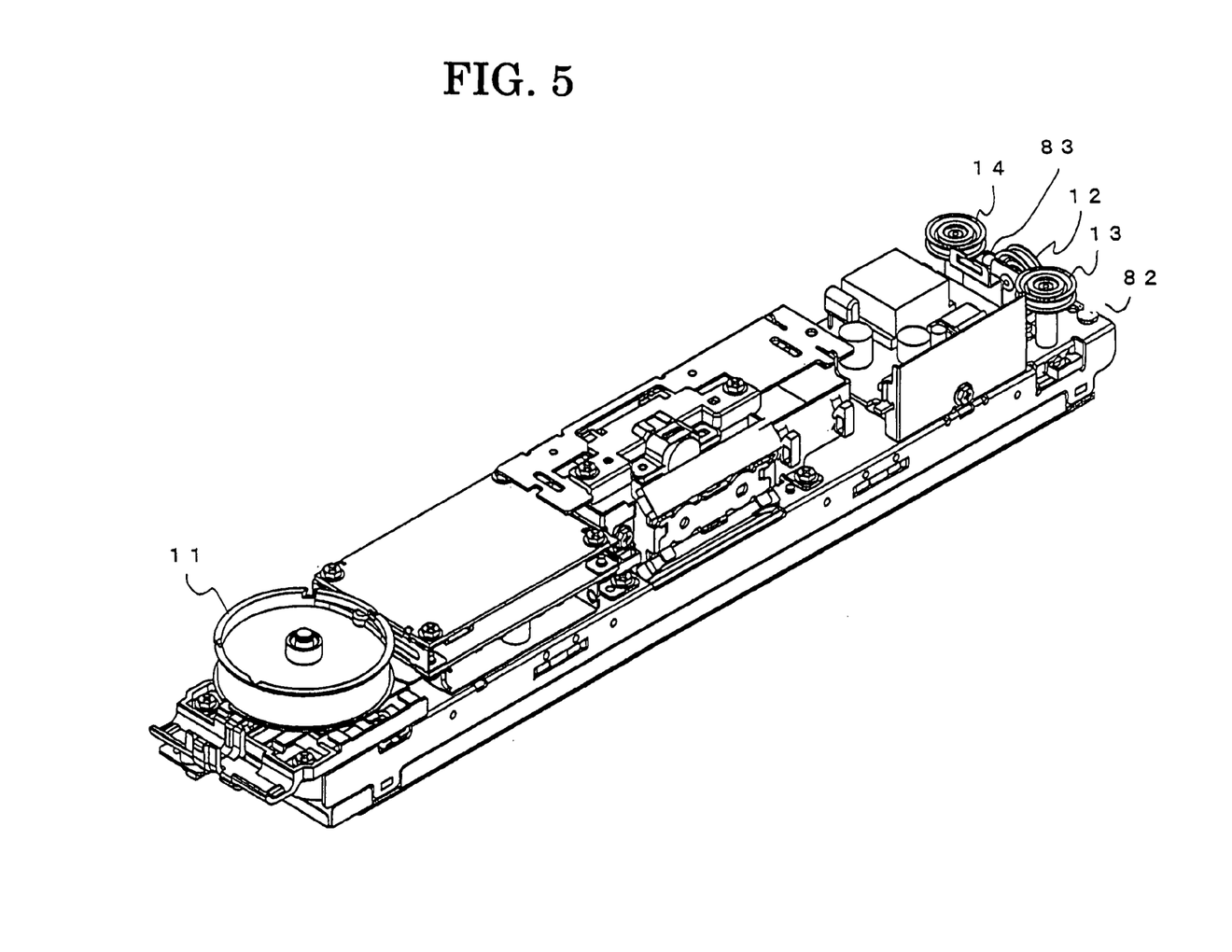
FIG. 5 is a perspective view of the module 1 in FIG. 3 viewed upward according to the present invention.
Figure 6:
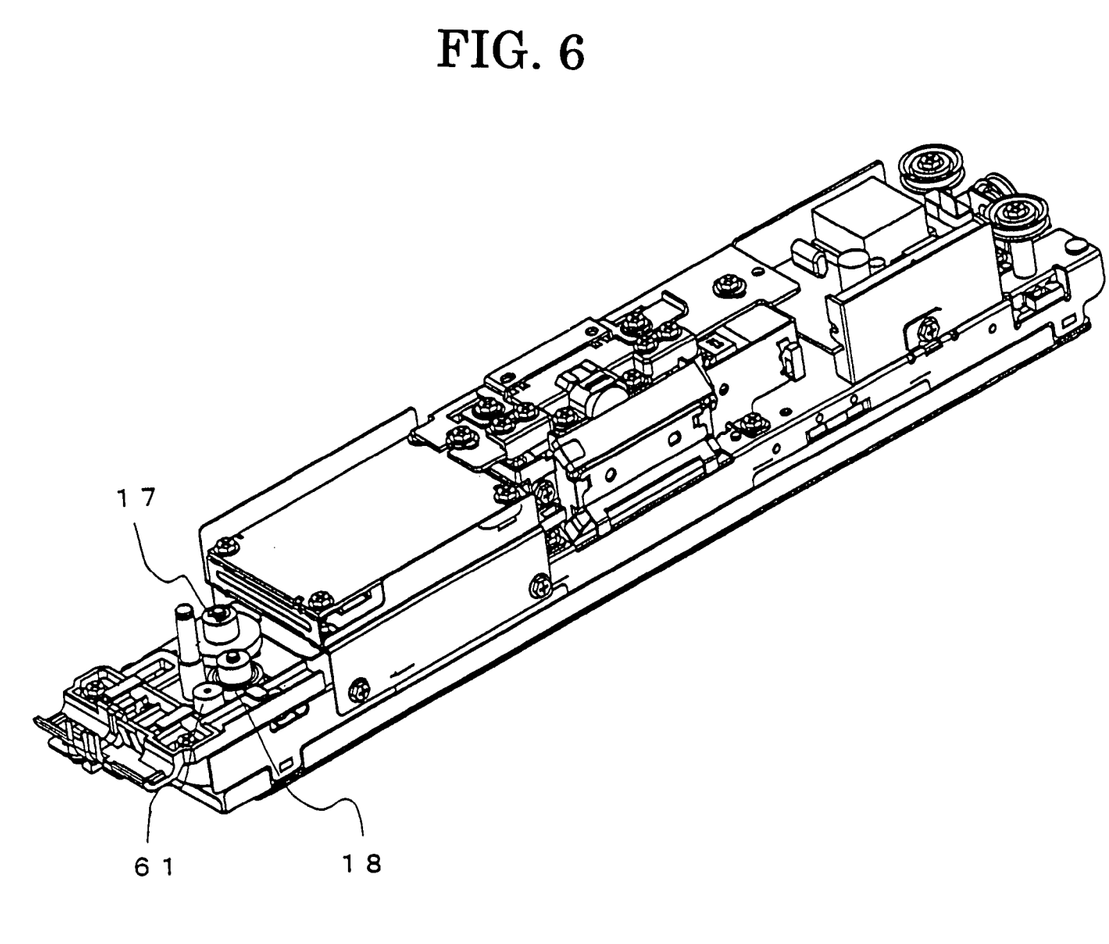
FIG. 6 is a perspective view of the module 1 in FIG. 5 with drum 11 as constituent part removed according to the present invention.

The module 1 of the original reader 100 will now be described with reference to FIGS. 3 to 6. FIG. 3 is a perspective view showing the module 1 viewed downward. FIG. 4 is a perspective view showing the FIG. 3 module 1 with the top module cover 16 removed. FIG. 5 is a perspective view of the module 1 in FIG. 3 viewed upward. FIG. 6 is a perspective view of the module 1 in FIG. 5 with drum 11 as constituent part removed.

The module 1 includes a frame (hereinafter also referred to as metal sheet frame) 4, an elongate linear lamp (or light source) 5, a drive motor (i.e., drive source) 6 of the module 1, a conductive member 9, a drum 11, the pulleys 12 to 14, a module cover 16 and gears 17 and 18. A first and a second optical system 2 and 3 (see FIGS. 7 and 8, respectively), are assembled together with the drive source 6 noted above in the module 1. The metal sheet frame 4 is disposed substantially at the center, i.e., in the vicinity, of the gravitational center, of the module 1.

As noted above, in the original reader 100 according to the present invention the original surface is scanned by mechanically scanning the module 1, which is constituted by the lamp 5 illuminating the original, the contracting optical system using the lens 31 ad the mirror and the CCD 32 as integral constituents, in directions normal to the main scanning directions (hereinafter referred to auxiliary scan) while causing line scan of the original with the CCD 32 (hereinafter referred to as main scan).

Now, the first optical system 2, which is assembled in the module 1 and constituting an essential part thereof will be described with reference to FIG. 7. The first optical system 2 has a length substantially equal to the module 1. The first optical system 2 has a first to third mirror 21 to 23, side members 24 and 25 having positioning parts 24a, 24b and 25a, 25b, respectively, and set screws 26, 27.

Figure 8A:
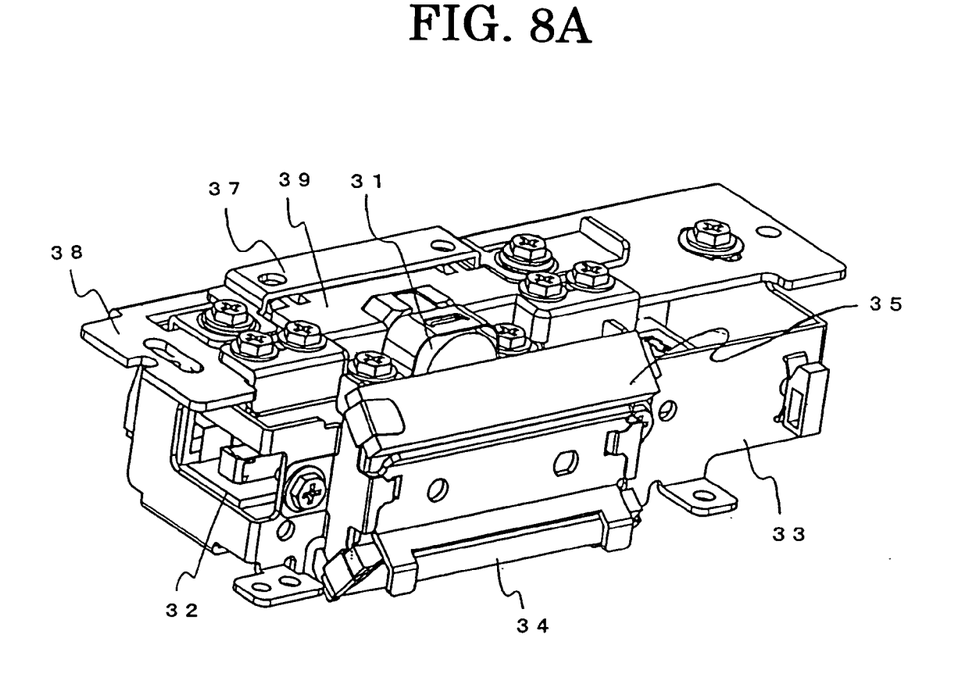
FIGS. 8(A) and 8(B) are perspective views of the second optical system used for the original reader according to the present invention.
Figure 8B:
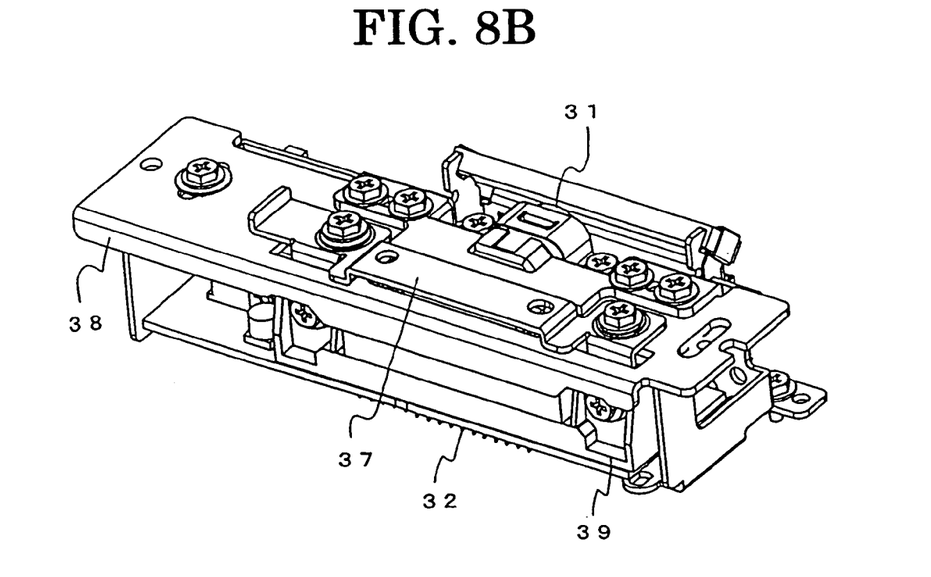

Next, the second optical system 3, which is assembled in the module 1 and constitutes an essential constituent thereof together with the first optical system 2, will be described, with reference to FIGS. 8(A) and 8(B). The second optical system 3 has a lens 31, a CCD 32, a second frame 33, a fourth to a sixth mirrors 34 to 36, a bracket 37, a stay 38 and a lens frame 39.

Figure 10:
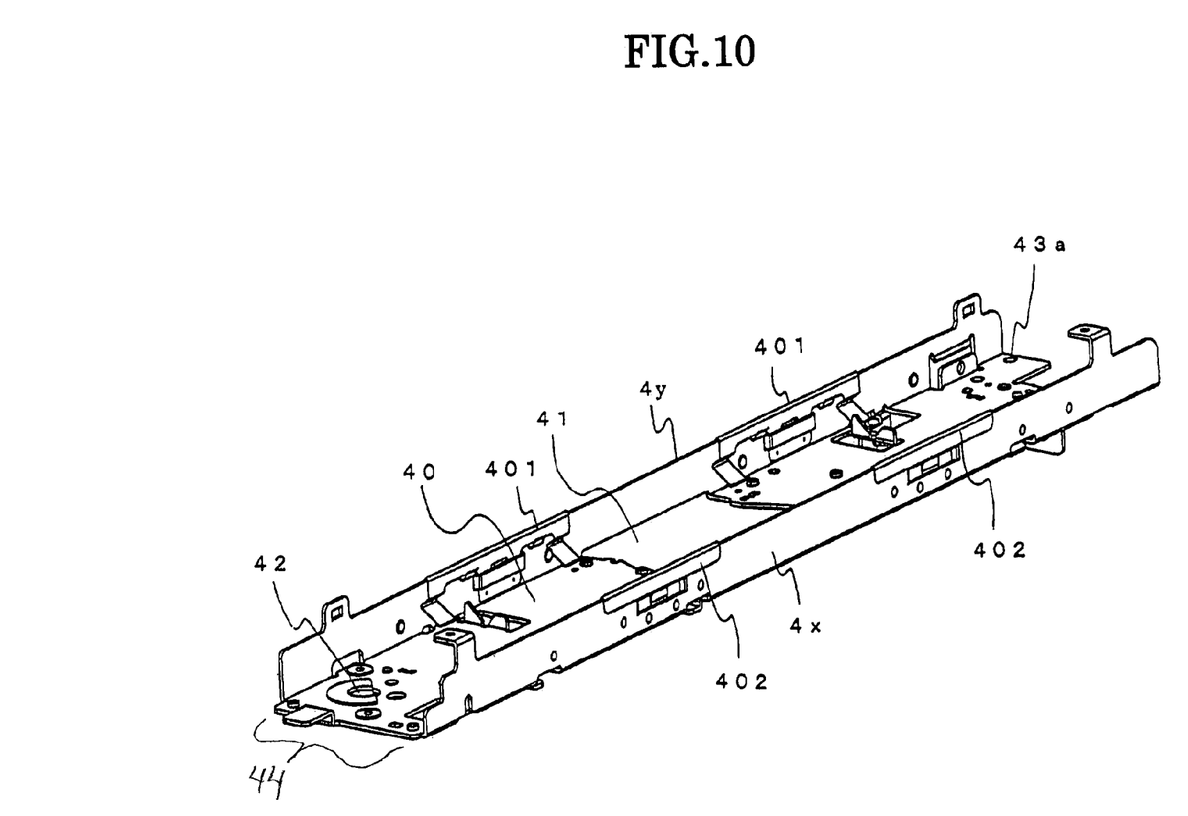
FIG. 10 is a perspective view showing the metal sheet frame 4 viewed downward.
Figure 11:
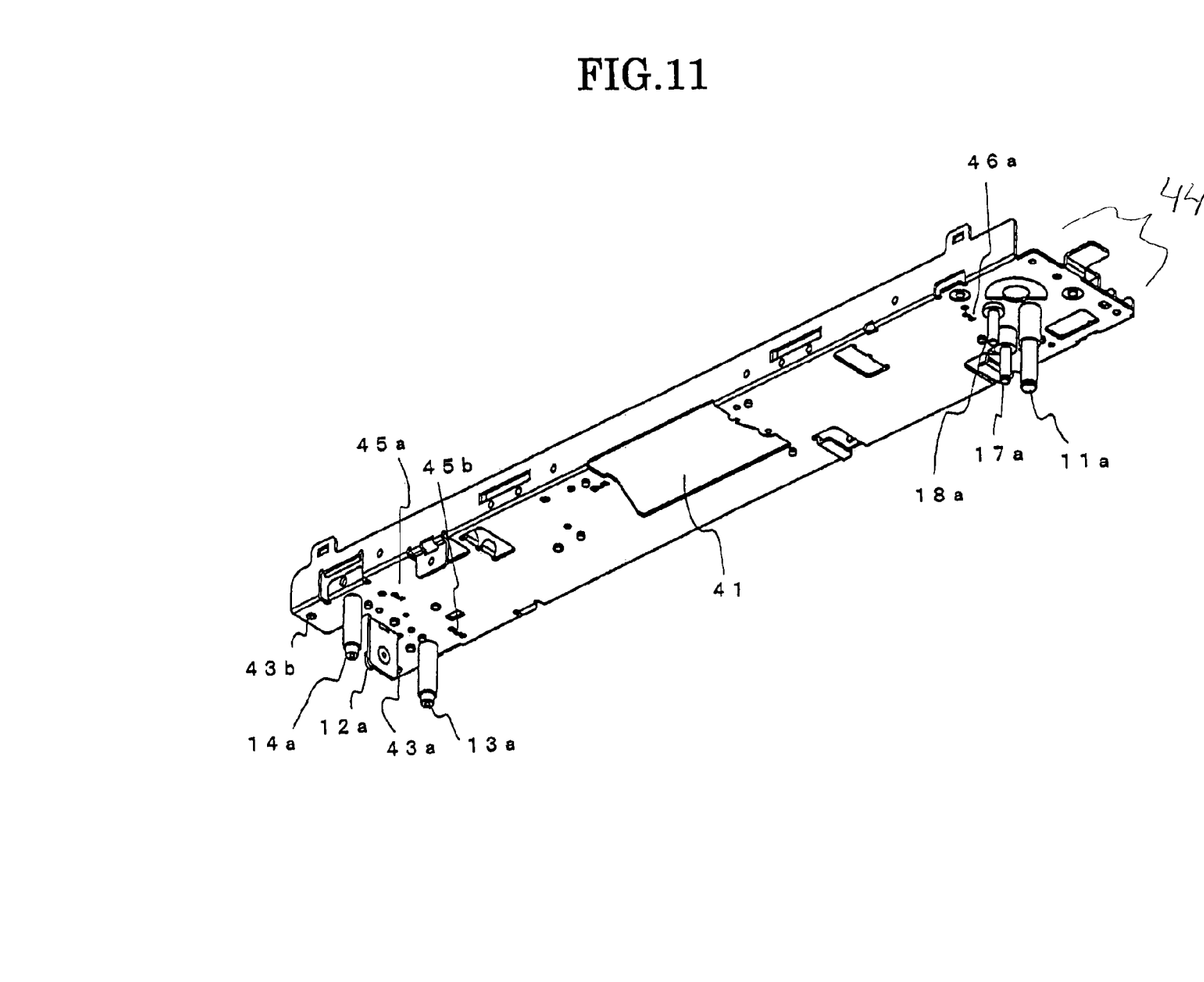
FIG. 11 is a perspective view of the metal sheet frame 4 viewed upward.

Now, the metal sheet frame 4 will be described with reference to FIGS. 10 and 11. FIG. 10 is a perspective view showing the metal sheet frame 4 viewed downward. FIG. 11 is a perspective view of the metal sheet frame 4 viewed upward. The metal sheet frame 4 has flat part 40, an opening 41 formed in the flat part 40 to provide for a light path, both side walls 4x and 4y, a notch 42 for a drive gear, a slide member mounting part 43, a drive guide 15 mounting part 44, positioning holes 45 and 46 formed in the side members 24 and 25 and a plurality of leaf springs 401 to 403.

As noted above, the metal sheet frame 4 has the flat part 40, which penetrates the vicinity of the gravitational center of the module 1 and extends parallel to the auxiliary scanning directions. The light path of the contracting optical system is reciprocated a plurality of times on the side of the first optical 2 system constituted by mirrors 21 to 23 nearer the original support surface of the flat part 40, and then penetrates the light path notch (or opening) 41 of the flat part 40 to be led to the second optical system 3, which is constituted by the lens 31, the CCD 32 and the minors 34 to 36 and located on the flat part 40 on the side thereof remote from the original support surface 110.

The drive motor 6 (see FIG. 4) as a drive source for driving the module 1 in the auxiliary scanning direction, is secured by set screws to the flat part 40 of the metal sheet frame 4 as best shown in FIG. 10. The shaft of the drive motor has a peripheral projection, which is fitted and positioned in a notch 42 formed on the flat part 40. As shown in FIG. 6, the drive gear 61 of the drive motor 6 has a smaller outer diameter than the inner diameter of the notch 42 of the flat part 40 so that it penetrates the notch (or opening) 42 of the flat part 40. The drive gear 61 drives the drive drum 11 via the transfer gear 17, which is mounted on a pin 17a provided on the flat part on the surface thereof opposite the drive motor 6.

As shown in FIGS. 5, 10 and 11, the flat part 40 has mounting parts 43a and 43b with slide members 82 and 83 mounted thereon. The slide members 82 and 83 support the module 1 with the horizontal surface formed by bending the front rail 8 as guide. The arrangement in which the horizontal surface formed by bending the front rail 8 is used as guide, is usual as carriage support of mirror scan system, and is not described here in detail.

Figure 9:
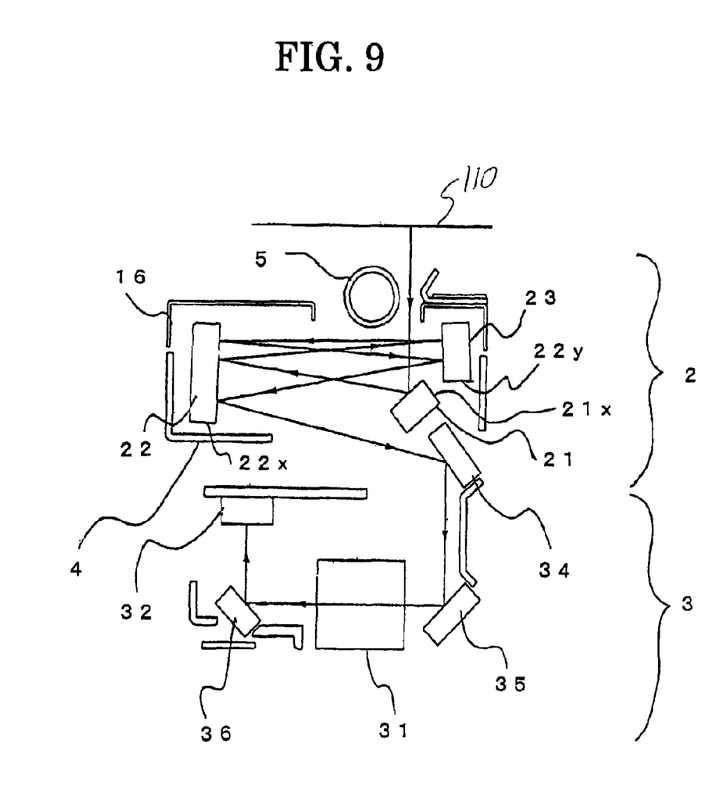
FIG. 9 is a sectional view showing the module 1 shown in FIGS. 3 to 6.
Figure 12:
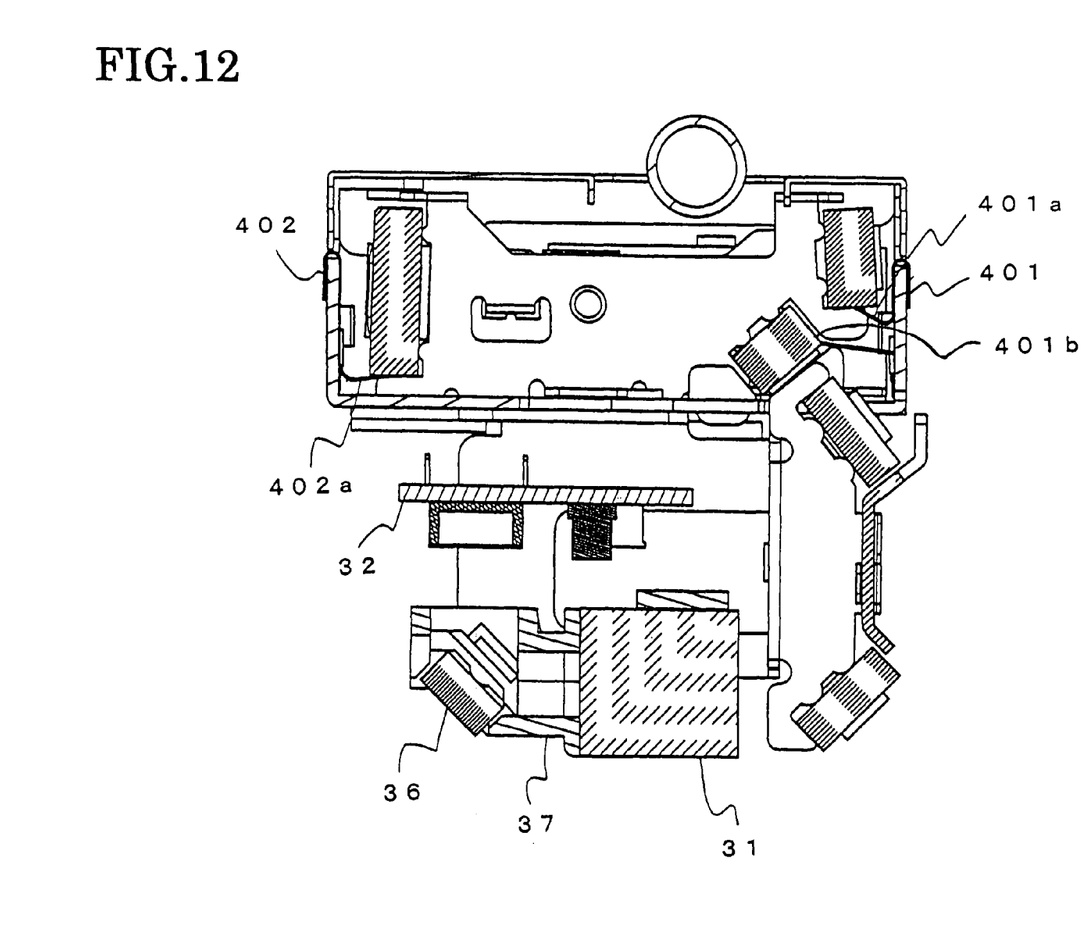
FIG. 12 is a side view corresponding to FIG. 9 shown in the module 1.

FIG. 9 is a sectional view showing the module 1 shown in FIGS. 3 to 6, particularly for describing the operation or function of the first and second optical systems 2 and 3 as essential constituting unit of the module 1. FIG. 12 is a side view corresponding to FIG. 9 shown in the module 1. As shown in FIGS. 9 and 12, the first optical system 2 includes the pair of substantially parallel mirrors 22 and 23 with the light path reciprocated there between and a mirror 21 for reflecting the light of the original (not shown) set on the original surface 110 to be incident on the mirrors 22 and 23. The mirrors 22 and 23 are substantially perpendicular to the original support surface 110, and the height of the mirror 23 slightly closer to the original support surface 110 is smaller than the mirror 22 spaced more apart from the original support surface 110. The mirror 21 is disposed on the side of the original support surface 110 opposite the mirrors 22 to 23. Light from the original support surface 110 toward the mirror 21 crosses the light path reciprocating the mirrors 22 and 23. With the above positional relation of the first optical system 2, the ends of the mirrors 22 and 23 can be held by side members 24 and 25 (see FIG. 7), respectively. Also, the light incident from the side of the mirror 21 reciprocates between the mirrors 22 and 23 before returning to the side of the mirror 21.

Figure 7:
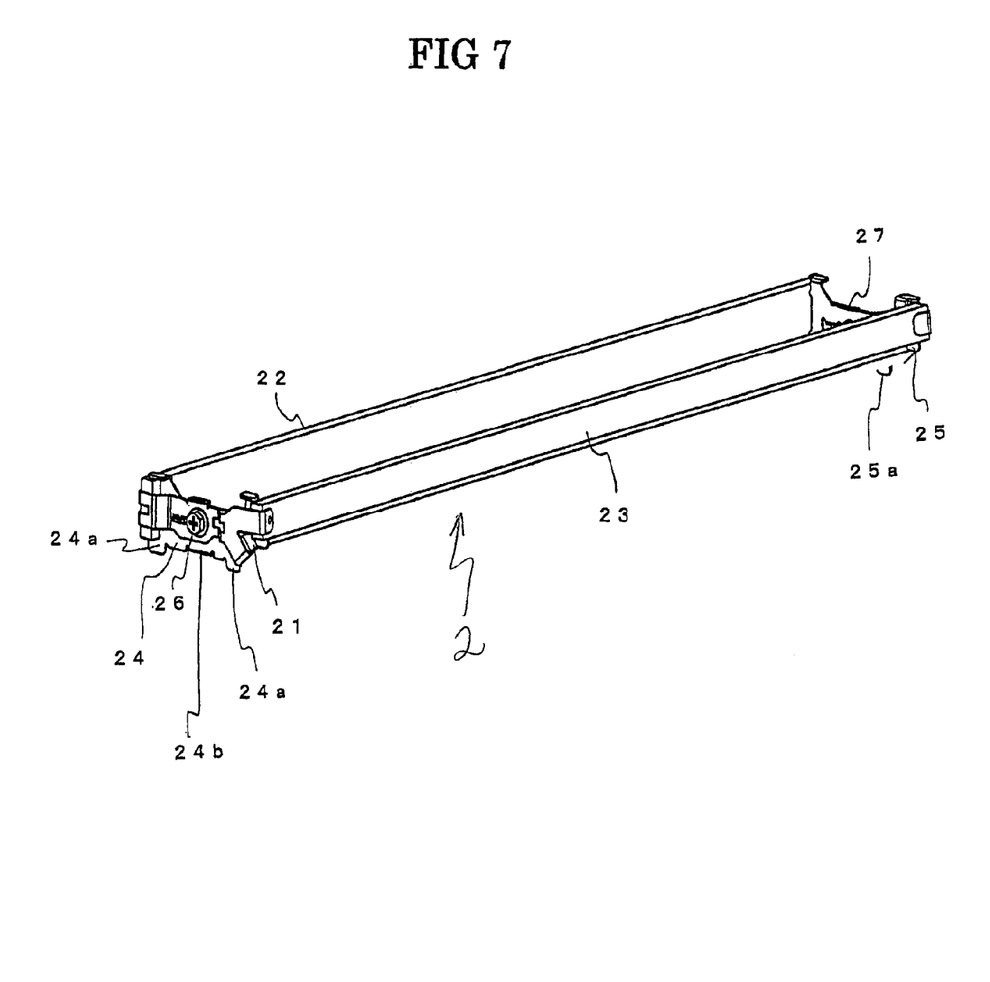
FIG. 7 is a perspective view of the first optical system used for the original reader.

As shown in FIG. 7, the ends of the mirrors 21 to 23 are pushed by the leaf springs 26 and 27 against the side members 24 and 25. The side members 24 and 25 have positioning parts 24a and 25a and bent parts 24b and 25b, and are screwedly secured to the flat part 40 via mounting holes of the bent parts 24b and 25b. The bent parts 24b and 25b have their size set slightly to the minus side so that the positioning parts 24a and 25a pushed against the flat part 40 as the set screws are screwed.

As shown in FIGS. 3 to 5. the shafts of the drum 11 and the pulley 13 and 14 with the wire passed thereround are secured to the flat flame part 40. Also, the conductive member 9 is mounted on an end of the metal sheet frame 4, and is electrically grounded via the front rail 8. The leaf springs 401 to 403 are mounted on the flat part 40, and are in contact with the mirrors 21 to 23, respectively, of the first optical system 2. Also, as shown in FIG. 10, the metal sheet frame 4 has bent walls 4x and 4y formed along the opposite side edges of the flat part 40, thus forming a substantially channel-shaped (⊐-shaped) form. This particular shape has an effect of reinforcing the rigidity of the metal sheet frame 4.

As described above, the highly rigid metal sheet frame 4 having a substantially channel-shaped sectional profile is disposed in the vicinity of the gravitational center, and the first and second optical systems 2 and 3 and the drive motor 6 therefor are mounted on the channel-shaped flat part 40 provided at the center of the frame 40. Accuracy is thus improved. Also, the leaf springs 26 and 27 are mounted on the same flat part 40 of the frame. Thus, in the event of occurrence of vibrations of the minors 21 to 23 to cause relative movement thereof, the slip of the contact parts of the minors 21 to 23 and the leaf springs 26 and 27 has an effect of converting the vibration energy to heat energy to quick attenuation of the vibrations of the minors 21 to 23. Consequently, the module 1 itself as a whole is subject to very little relative position changes, and it is thus possible to obtain very stable performance and quality.

Furthermore, copiers and like original readers, for which image quality improvement and speed increase are particularly demanded, usually adopt the so-called mirror scan stem. This mirror scan system comprises a first carriage, which has a CCD and a lens both secured to a housing for scanning by one mirror and a light source over the entire mounted scan length, and a second carriage, which has two mirrors having relative 90 degree angle and follows the first carriage for a distance corresponding to one half the scanning length at one half the speed of the first carriage. This mirror scan system scans the entire original by holding a constant distance between a scan line on the original and the scan line of the CCD. To realize stable relative movement of the first and second carriages, a mechanism constituted by a wire and pulleys is usually used. Specifically, a drive unit with the wire secured to a housing is used for driving.

It seems that the original reader according to the present invention, in which the first and second optical systems are mounted inclusive of the drive source on the same metal sheet frame, is more subject to adverse effects of vibrations or to like generated by the drive system compared to the prior art original reader described above. However, the adverse effects are rather less as will be understood from the following description.

First, the relation between the mirror scan system and the vibrations of the drive system will be described. It is well known that in this type of original reader the image quality is deteriorated due to vibrations generated by the drive system such as the motor and gear. However, the actually generated vibrations of the drive system mounts to a difference of several percent in terms of the scan width of adjacent lines, and this level has no effects on the intrinsic image quality. Even in the color case, a difference of 25 percent or below has no adverse effects on the image quality. It is only when the scanning width difference exceeds 50 percent that the adverse effects become obvious. The deterioration of the mirror scan system image quality is generated by relative motion between the lens and the CCD and the first and second carriages. For example, in the case of vibrations such that the CCD is rotated about the lens, the adverse effects are enlarged to an extent corresponding to the magnification of the contracting optical system, and the adverse effects are thus enlarged to about 10 times. These units are disposed in a dispersed fashion in a housing of about 500 mm×500 mm, and the first and second carriages are restricted by wire in the scanning direction. Therefore, different operation is dictated to ensure sufficient rigidity for maintaining the relative positional relation. Also, the drive system requires sufficient measures against vibrations.

In the original reader according to the present invention, the drive system and reading system are all secured to the same surface of the same metal sheet frame. Thus, the possibility of occurrence of the above relative movement is almost zero or very low. With respect to the vibrations of the mirrors in the first optical system, a more excellent measure against vibrations than in the case of the mirror scan system is necessary. According to the present invention, it is possible to take an efficient measure. The mirror in the second optical system is sufficiently low in size and is thus free from generation of vibrations adversely affecting the image quality. Thus, no leaf spring like those noted above is necessary.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An original reader comprising a module including, as integral constituents, a light source for illuminating an original, a contracting optical system having a lens and a mirror and a line sensor, for reading out original surface data by performing main scanning to linearly scan the original with the line sensor and auxiliary scanning to mechanically scan the module in directions normal to the main scanning directions, wherein:

the contracting optical system comprises a first optical system and a second optical system;

the module includes the first optical system and a metal sheet frame, the metal sheet frame extending parallel to the auxiliary scanning directions, the first optical system being positioned and secured to a flat part of the frame; and the light path of the contracting optical system is reciprocated a plurality of times on the side closer to the original surface on the flat part of the frame in the first optical system constituted by a plurality of mirrors before penetrating an opening in the frame flat part and being led to a second optical system disposed more apart from the original surface of the frame flat part and constituted by a lens, a CCD and a mirror, wherein the metal sheet frame is arranged inside the module and is disposed between the first optical system and the second optical system, wherein a drive source for driving the module in the auxiliary scanning direction is secured to the flat part of the frame such that a drive gear of the drive source penetrates a notch formed in the frame flat part and the drive gear of the drive source transfers the drive power of the drive source via the shaft of a transfer gear for the transfer, the transfer gear shaft being provided on the frame flat part on the side thereof opposite the drive source, and wherein the flat part of the frame has a slide member corresponding to a rail for guiding the module in the auxiliary scanning directions.

2. The original reader according to claim 1, wherein the first optical system is constituted by a pair of substantially parallel mirrors with the light path reciprocated therebetween and a single mirror for causing light from the original to be incident on the pair of mirrors, the pair of mirrors are substantially normal to the original surface, the single mirror is located on the side of the pair of mirrors opposite the original surface, the light path led from the original surface to the single mirror crosses the light path of reciprocation between the pair of mirrors, and the pair of mirrors and the single mirror have their ends each positioned by a side member with the edge thereof positioned on the flat part of the frame.

3. The original reader according to claim 1, wherein the module has a drum shaft and pulley shafts secured to the same surface of the flat part of the frame, with a wire passed round the drum and pulleys for driving the module.

4. The original reader according to claim 1, wherein an electrically conductive member is mounted on the end of the frame and electrically grounded via the rails.

5. The original reader according to claim 1, wherein the slide member also serves as the electrically conductive member.

6. The original reader according to claim 1, wherein leaf springs are mounted on the frame and in contact with end parts of the mirrors in the first optical system, the contact parts of the mirrors and the leaf springs being capable of slipping relative to one another to thereby convert vibration energy to heat energy, thus attenuating vibrations of the mirrors.

* * * * *